United States Patent
Yamaguchi et al.

(10) Patent No.: US 7,892,141 B2
(45) Date of Patent: Feb. 22, 2011

(54) SPEED RATIO CHANGE CONTROL DEVICE AND METHOD FOR BELT TYPE CONTINUOUSLY VARIABLE TRANSMISSION

(75) Inventors: Midori Yamaguchi, Yokohama (JP); Fumito Shinohara, Atsugi (JP); Yoshihisa Kodama, Sagamihara (JP)

(73) Assignee: Jatco Ltd, Fuji-shi (JP)

( * ) Notice: Subject to any disclaimer, the term of this patent is extended or adjusted under 35 U.S.C. 154(b) by 589 days.

(21) Appl. No.: 11/953,912

(22) Filed: Dec. 11, 2007

(65) Prior Publication Data

US 2008/0146409 A1    Jun. 19, 2008

(30) Foreign Application Priority Data

Dec. 15, 2006 (JP) .............................. 2006-337966

(51) Int. Cl.
*F16H 61/662* (2006.01)
(52) U.S. Cl. .......................................... 477/46; 477/45
(58) Field of Classification Search ................... 477/37, 477/44, 45, 46
See application file for complete search history.

(56) References Cited

U.S. PATENT DOCUMENTS

| | | | |
|---|---|---|---|
| 5,257,960 A | 11/1993 | Sato | |
| 5,924,450 A * | 7/1999 | Sakakibara et al. | 137/625.66 |
| 6,179,739 B1 * | 1/2001 | Tsai et al. | 474/12 |
| 6,290,620 B1 * | 9/2001 | Tsai et al. | 474/18 |
| 6,800,044 B2 | 10/2004 | Inamura | |
| 7,065,441 B2 * | 6/2006 | Yamamoto et al. | 701/51 |
| 7,140,991 B2 | 11/2006 | Sawada et al. | |
| 7,654,935 B2 * | 2/2010 | Tanaka et al. | 477/45 |
| 7,699,729 B2 * | 4/2010 | Inoue et al. | 474/28 |
| 2003/0149520 A1 | 8/2003 | Taniguchi et al. | |
| 2004/0127330 A1 | 7/2004 | Sawada et al. | |
| 2004/0128046 A1 | 7/2004 | Yamamoto et al. | |

FOREIGN PATENT DOCUMENTS

| | | | |
|---|---|---|---|
| JP | 04-171354 A | 6/1992 | |
| JP | 11-082706 A | 3/1999 | |
| JP | 2003-343711 A | 12/2003 | |
| JP | 2004-092669 A | 3/2004 | |
| JP | 2004-124965 A | 4/2004 | |
| JP | 2004-360725 A | 12/2004 | |
| JP | 2005-291290 A | 10/2005 | |
| JP | 2005-291295 A | 10/2005 | |
| JP | 2006-105174 A | 4/2006 | |
| JP | 2008151198 A * | 7/2008 | |

OTHER PUBLICATIONS

T. Inoue, U.S. PTO Notice of Allowance; U.S. Appl. No. 11/953,916, dated Dec. 10, 2009, 8 pages.
U.S. Appl. No. 11/953,916, filed Dec. 11, 2007, Inoue et al.
T. Inoue, U.S. PTO Office Action, U.S. Appl. No. 11/953,916, Apr. 3, 2009, 11 pages.

* cited by examiner

*Primary Examiner*—Ha D. Ho
(74) *Attorney, Agent, or Firm*—Foley & Lardner LLP

(57) ABSTRACT

A speed ratio change control device for a belt type continuously variable transmission calculates a maximum thrust that can be generated by the primary pulley on the basis of an upper limit value of the line pressure, calculates an upper limit value of a shift speed on the basis of the maximum thrust, and sets the target speed ratio on the basis of the upper limit value of the shift speed.

12 Claims, 5 Drawing Sheets

SPEED RATIO CHANGE CONTROL DEVICE AND METHOD FOR BELT TYPE CONTINUOUSLY VARIABLE TRANSMISSION

FIELD OF THE INVENTION

This invention relates to a speed ratio change control device for a belt type continuously variable transmission.

BACKGROUND OF THE INVENTION

JP2006-105174A published by the Japan Patent Office in 2006 discloses a belt type continuously variable transmission in which a link mechanism, one end of which is connected to a step motor and another end of which is connected to a movable sheave of a primary pulley, is connected to a speed ratio change control valve. The belt type continuously variable transmission controls a speed ratio by driving the speed ratio change control valve in accordance with the feed of the step motor and receiving feedback regarding an actual speed ratio in accordance with the displacement of the movable sheave.

SUMMARY OF THE INVENTION

When a rapid shift to a High side is performed from a state of high secondary pressure, for example when the speed ratio is fixed in a manual mode and the engine rotation speed exceeds a predetermined rotation speed during acceleration such that an auto-upshift is performed, a required value of a primary pressure reaches a maximum in order to obtain a differential thrust. However, since the secondary pressure is high, a large differential thrust cannot be obtained.

Furthermore, a maximum pressure of a line pressure serving as the source pressure of the secondary pressure and primary pressure is limited by a discharged oil amount balance of a pump, and needless to say, the primary pressure cannot be set at a pressure which exceeds the maximum line pressure. For this reason also, a large differential thrust cannot be obtained.

Hence, the speed change is delayed, leading to an increase in the difference between an actual speed ratio and a target speed ratio and a corresponding increase in a feedback correction amount, and as a result, the opening on the side of the speed ratio change control valve that supplies the primary pressure reaches a maximum, and an excessive oil pressure is supplied to the primary pulley.

Hence, the actual speed ratio undershoots the target speed ratio, and therefore a drain side passage of the speed ratio change control valve is opened in order to return the actual speed ratio. However, at this time, too much primary pressure may escape, leading to belt slippage.

It is therefore an object of this invention to prevent belt slippage when a rapid shift to a High side is performed from a state of high secondary pressure.

In order to achieve the above object, this invention provides a speed ratio change control device for a belt type continuously variable transmission that comprises a continuously variable speed ratio change mechanism in which a belt is wrapped around a primary pulley and a secondary pulley and a speed ratio is varied by controlling a pressure supplied to each pulley to displace a movable sheave of each pulley, a speed ratio change control valve which controls a primary pressure that serves as the pressure supplied to the primary pulley, using a line pressure supplied by a hydraulic pump as a source pressure, and a link mechanism which moves the speed ratio change control valve to a position in which the primary pressure varies when a speed ratio change actuator moves to a position corresponding to a target speed ratio of the continuously variable speed ratio change mechanism, and returns the speed ratio change control valve to a position in which the primary pressure is maintained by varying the primary pressure such that the movable sheave of the primary pulley displaces. The device comprises a controller which calculates a maximum thrust that can be generated by the primary pulley on the basis of an upper limit value of the line pressure, calculates an upper limit value of the shift speed of the continuously variable speed ratio change mechanism on the basis of the maximum thrust that can be generated by the primary pulley, and sets the target speed ratio of the continuously variable speed ratio change mechanism on the basis of the upper limit value of the shift speed.

The details as well as other features and advantages of this invention are set forth in the remainder of the specification and are shown in the accompanying drawings.

DESCRIPTION OF THE PREFERRED EMBODIMENTS

An embodiment of this invention will be described in detail below with reference to the figures and so on.

Figure 1:
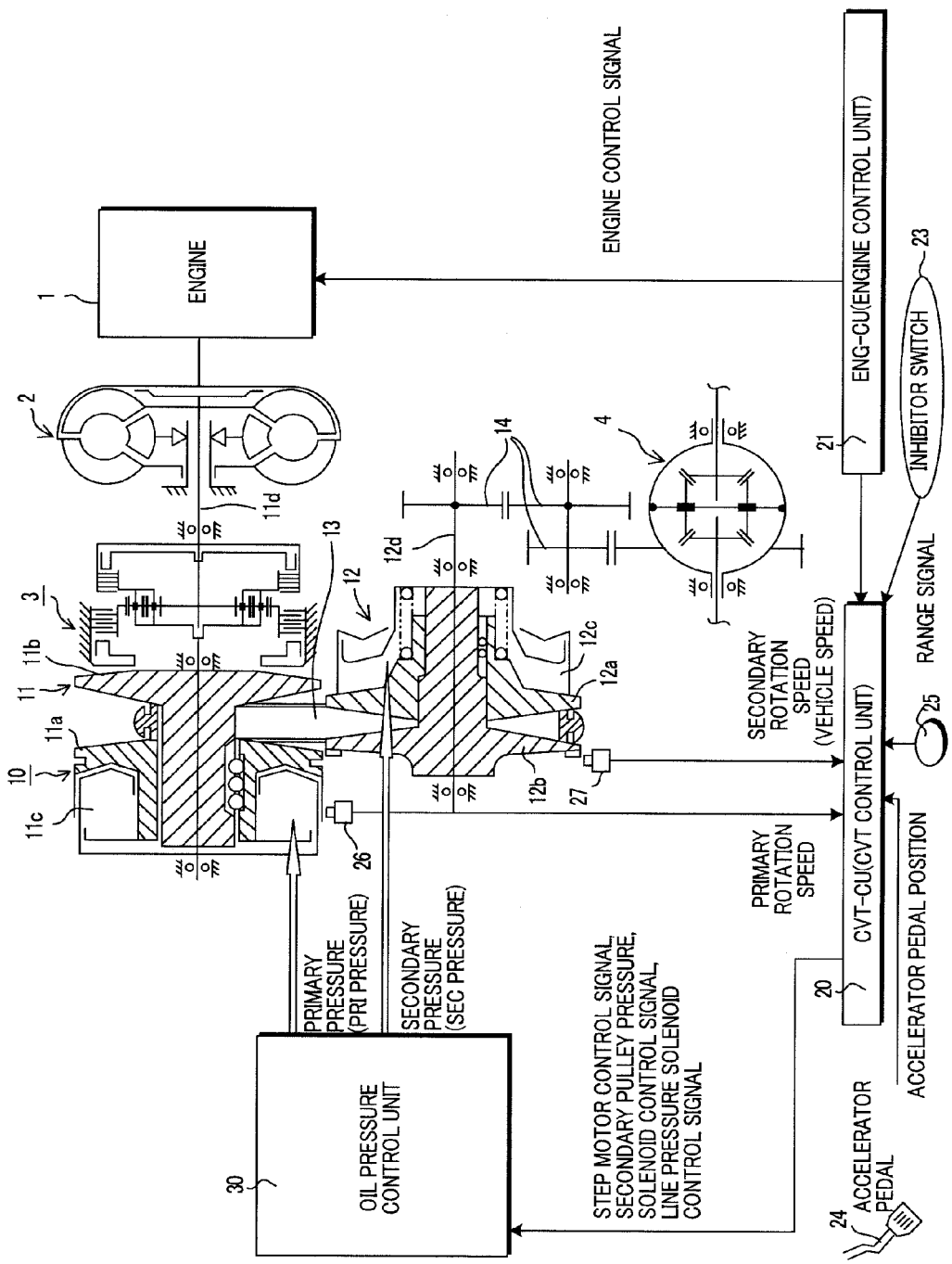
FIG. 1 is a schematic constitutional diagram showing a speed ratio change control device for a belt type continuously variable transmission according to an embodiment.

FIG. 1 is a schematic constitutional diagram showing a line pressure control device of a belt type continuously variable transmission according to this embodiment. A belt type continuously variable transmission 10 comprises a primary pulley 11, a secondary pulley 12, a V belt 13, a CVT control unit 20 (to be referred to as CVTCU hereafter), and an oil pressure control unit 30.

The primary pulley 11 is an input shaft side pulley which inputs the rotation of an engine 1 into the belt type continuously variable transmission 10. The primary pulley 11 comprises a fixed conical plate 11b which rotates integrally with an input shaft 11d, and a movable conical plate 11a which is disposed opposite the fixed conical plate 11b to form a V-shaped pulley groove, and which can be displaced axially by oil pressure acting on a primary pulley cylinder chamber 11c. The primary pulley 11 is connected to the engine 1 via a forward-reverse switching mechanism 3 and a torque converter 2 comprising a lockup clutch, and inputs the rotation of the engine 1. The rotation speed of the primary pulley 11 is detected by a primary pulley rotation speed sensor 26.

The V belt 13 is wrapped around the primary pulley 11 and secondary pulley 12 such that the rotation of the primary pulley 11 is transmitted to the secondary pulley 12.

The secondary pulley 12 outputs the rotation transmitted by the V belt 13 to a differential 4. The secondary pulley 12 comprises a fixed conical plate 12b which rotates integrally with an output shaft 12d, and a movable conical plate 12a which is disposed opposite the fixed conical plate 12b to form a V-shaped pulley groove, and which can be displaced axially in accordance with oil pressure acting on a secondary pulley cylinder chamber 12c. It should be noted that the pressure-receiving surface area of the secondary pulley cylinder chamber 12c is set substantially equally to the pressure-receiving surface area of the primary pulley cylinder chamber 11c.

The secondary pulley 12 is connected to the differential 4 via an idler gear 14 and an idler shaft, and outputs rotation to the differential 4. The rotation speed of the secondary pulley 12 is detected by a secondary pulley rotation speed sensor 27. The vehicle speed can be calculated from the rotation speed of the secondary pulley 12.

The CVTCU 20 determines the speed ratio and a contact frictional force on the basis of signals from an inhibitor switch 23, an accelerator pedal position sensor 24, an oil temperature sensor 25, the primary pulley rotation speed sensor 26, the secondary pulley rotation speed sensor 27, and so on, as well as input torque information from an engine control unit 21, and controls the belt type continuously variable transmission 10 by transmitting commands to the oil pressure control unit 30.

The oil pressure control unit 30 operates on the basis of the commands from the CVTCU 20. The oil pressure control unit 30 moves the movable conical plate 11a and the movable conical plate 12a in a rotary axis direction by controlling the oil pressure that is supplied to the primary pulley 11 and secondary pulley 12.

When the movable conical plate 11a and the movable conical plate 12a move, the pulley groove width varies, and as a result, the V belt 13 moves over the primary pulley 11 and secondary pulley 12. Thus, the contact radius between the V belt 13 and the primary pulley 11 and secondary pulley 12 varies, whereby the speed ratio and the contact frictional force of the V belt 13 are controlled.

The rotation of the engine 1 is input into the belt type continuously variable transmission 10 via the torque converter 2 and the forward-reverse switching mechanism 3 and transmitted from the primary pulley 11 to the differential 4 via the V belt 13 and secondary pulley 12.

When the accelerator pedal is depressed or a shift change is performed in a manual mode, the movable conical plate 11a of the primary pulley 11 and the movable conical plate 12a of the secondary pulley 12 are axially displaced, thereby varying the contact radius thereof with the V belt 13 such that the speed ratio is varied continuously.

Figure 2:
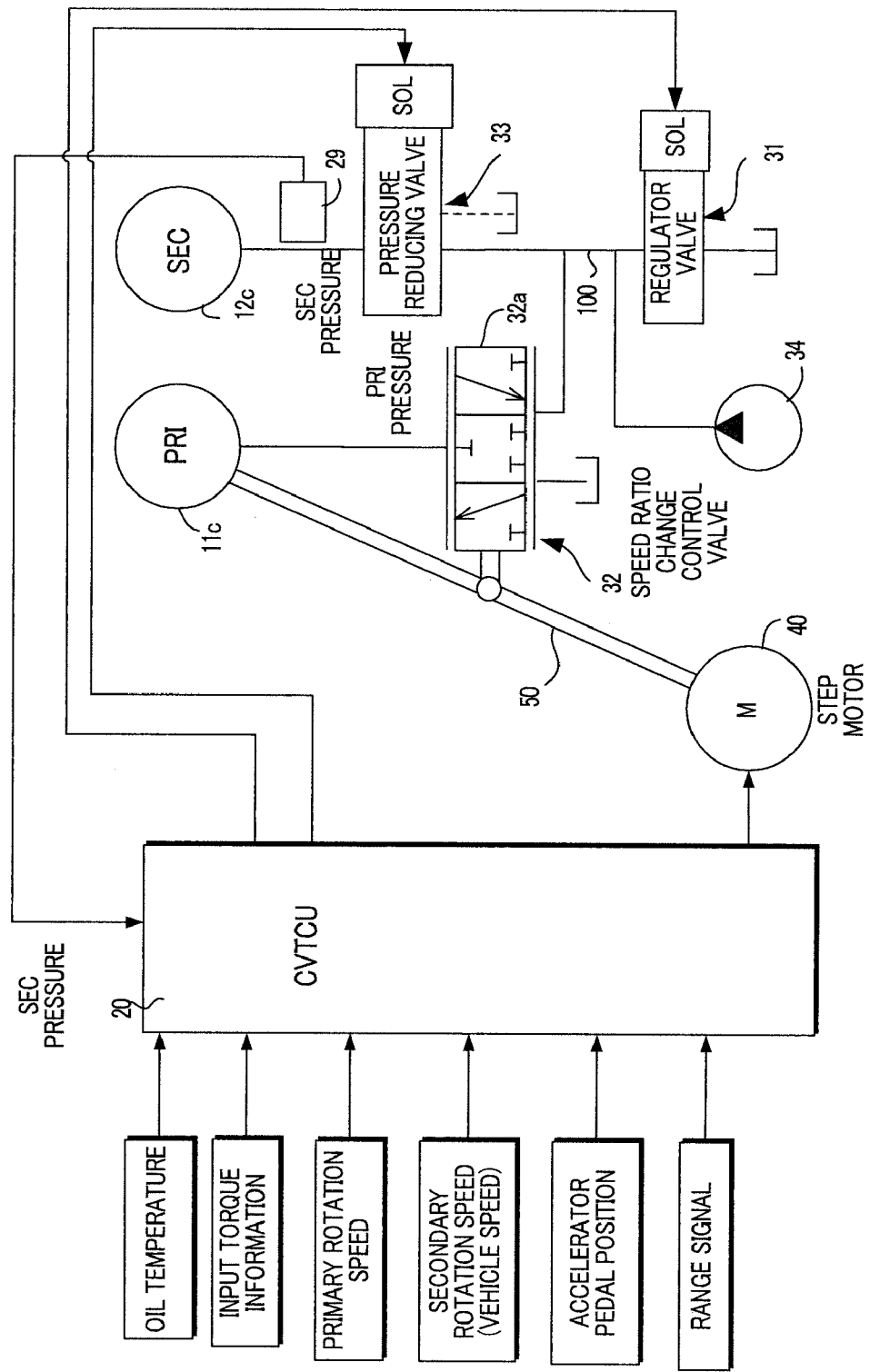
FIG. 2 is a schematic diagram of an oil pressure control unit and a CVTCU.

FIG. 2 is a schematic diagram of the oil pressure control unit and the CVTCU.

The oil pressure control unit 30 comprises a regulator valve 31, a speed ratio change control valve 32, and a pressure reducing valve 33. The oil pressure control unit 30 controls oil pressure supplied by a hydraulic pump 34, and supplies the oil pressure to the primary pulley 11 and secondary pulley 12.

The regulator valve 31 is a pressure regulating valve which comprises a solenoid and regulates the pressure of the oil pumped by the hydraulic pump 34 to a predetermined line pressure in accordance with a command (for example, a duty signal or the like) from the CVTCU 20.

The line pressure supplied by the hydraulic pump 34 and regulated by the regulator valve 31 is supplied to the speed ratio change control valve 32 and the pressure reducing valve 33, respectively.

The speed ratio change control valve 32 is a control valve that controls the oil pressure (primary pressure hereafter) in the primary pulley cylinder chamber 11c to a desired target pressure. The speed ratio change control valve 32 is connected to a servo link 50 (link mechanism) constituting a mechanical feedback mechanism. The speed ratio change control valve 32 is driven by a step motor 40 connected to one end of the servo link 50, and receives feedback regarding the groove width, or in other words the actual speed ratio, from the movable conical plate 11a of the primary pulley 11, which is connected to the other end of the servo link 50. The speed ratio change control valve 32 regulates the primary pressure by supplying and discharging oil pressure to and from the primary pulley cylinder chamber 11c through displacement of a spool 32a, thereby realizing a target speed ratio which is indicated by a drive position of the step motor 40, and when the speed change is actually complete, the speed ratio change control valve 32 receives the displacement from the servo link 50 and holds the spool 32a in a closed position.

The pressure reducing valve 33 is a control valve which comprises a solenoid and controls pressure (secondary pressure hereafter) supplied to the secondary pulley cylinder chamber 12c to a desired target pressure.

The speed ratio of the primary pulley 11 and secondary pulley 12 is controlled by the step motor 40, which is driven in accordance with a speed change command signal from the CVTCU 20. The spool 32a of the speed ratio change control valve 32 is driven in accordance with the displacement of the servo link 50, which operates in conjunction with the step motor 40, and thus the line pressure supplied to the speed ratio change control valve 32 is regulated such that the primary pressure is supplied to the primary pulley 11. As a result, the groove width is variably controlled and set to a predetermined speed ratio.

The CVTCU 20 variably controls the speed ratio and the contact frictional force of the V belt 13 by reading a range signal from the inhibitor switch 23, an accelerator pedal position from the accelerator pedal position sensor 24, an oil temperature of the belt type continuously variable transmission 10 from the oil temperature sensor 25, signals from the primary pulley speed sensor 26, the secondary pulley speed sensor 27, an oil pressure sensor 29, and so on. It should be noted that the oil pressure sensor 29 is a sensor which detects the secondary pressure applied to the secondary pulley cylinder chamber 12c.

The CVTCU 20 determines an optimum speed ratio (ultimate speed ratio) for the corresponding operating conditions in accordance with the vehicle speed, the accelerator pedal position, and so on. The CVTCU 20 then calculates an intermediate target speed ratio (target speed ratio) with respect to the ultimate speed ratio, and performs control to provide a shifting process from the current speed ratio to the ultimate speed ratio with a desired characteristic. The target speed ratio is set at a first order lag to the ultimate speed ratio, and the shift speed is adjusted by adjusting the time constant (normal time constant) at this time as desired according to the operating conditions of the vehicle, the operating mode of the belt type continuously variable transmission 10, and so on. After performing feedforward compensation processing, feedback compensation processing, disturbance compensation processing, and the like on the target speed ratio, a final target speed ratio is determined. The final target speed ratio is then converted into a drive signal of the step motor 40, whereupon the step motor 40 is driven to shift the current speed ratio toward the target speed ratio.

Further, the CVTCU 20 determines a target line pressure value from input torque information, the speed ratio, and the oil temperature, performs line pressure control by driving the solenoid of the regulator valve 31, determines a target secondary pressure value, drives the solenoid of the pressure reducing valve 33 in accordance with the detected value of the oil pressure sensor 29 and a target value, and controls the secondary pressure through feedback control.

Figure 3:
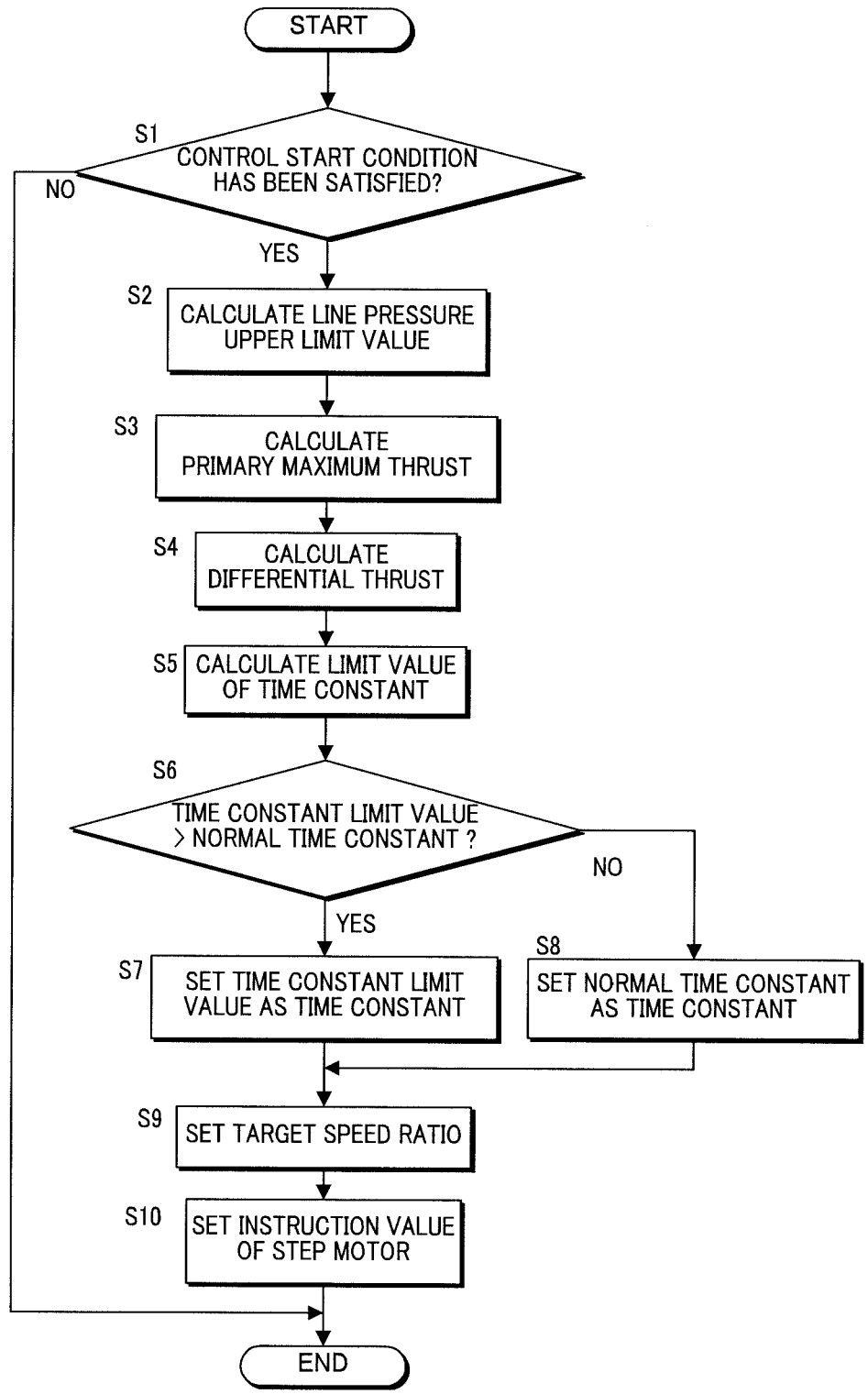
FIG. 3 is a flowchart showing the control of the speed ratio change control device for a belt type continuously variable transmission according to this embodiment.

The control performed by the CVTCU 20 will be described below with reference to the flowchart in FIG. 3. It should be noted that this control is performed repeatedly at very small time intervals (of 10 ms, for example).

In a step S1, a determination is made as to whether or not a control start condition has been satisfied. If the control start condition is satisfied, the routine advances to a step S2, and if not, the processing is terminated. The control start condition is that an upshift is underway, a shift lever is in a range other than an N range and a P range, a balance pressure, which is the primary pressure when the speed ratio is in a state of equilibrium, is not in a state where it cannot be calculated accurately, it is not in a state in which the input torque that is input into the transmission can be corrected, and so on. In this step, it is determined that the condition is satisfied when all of the above conditions are established.

Here, when the deviation between the ultimate speed ratio and the target speed ratio is equal to or less than a predetermined value, it is determined that an upshift is underway. The determination is made in this manner to prevent a situation in which the actual speed ratio undershoots the target speed ratio during the control, which is performed assuming that an upshift is underway, such that a driver performs a downshift operation, as a result of which it is determined that a downshift is underway and the control is cancelled. Further, a state in which the balance pressure cannot be calculated accurately occurs when a driving wheel slips, the vehicle is stationary, and so on. A state in which the input torque input into the transmission can be corrected occurs when an irregularity occurs in the inhibitor switch 23, an irregularity occurs in the engine rotation speed, and so on.

In a step S2, an upper limit value of the line pressure is calculated. The line pressure upper limit value is the smaller of a maximum generated pressure that can be generated by the hydraulic pump 34 and a generated pressure determined in consideration of the oil temperature and the rotation speed of the hydraulic pump 34. The oil temperature and the rotation speed of the hydraulic pump 34 affect the oil amount balance such that when the oil temperature is too high or too low, for example, the generated pressure decreases, and as the rotation speed of the hydraulic pump 34 falls, the generated pressure decreases.

In a step S3 (primary maximum thrust calculating means), a maximum thrust that can be generated in the primary pulley 11 is calculated. The maximum thrust that can be generated in the primary pulley 11 is the thrust generated in the primary pulley 11 when the line pressure upper limit value calculated in the step S2 is supplied as the primary pressure, and is calculated by multiplying the pressure-receiving surface area of the primary pulley cylinder chamber 11c by the line pressure upper limit value.

In a step S4, a differential thrust is calculated. The differential thrust is the difference between a balance thrust, which is the thrust of the primary pulley 11 when the primary pressure and secondary pressure are balanced such that the speed ratio is in a state of equilibrium, and the maximum thrust of the primary pulley 11.

In a step S5 (shift speed upper limit value calculating means), a limit value of a time constant is calculated on the basis of the differential thrust. Here, the time constant is a parameter used to determine the shift speed. As the time constant increases, the shift speed slows, and as the time constant decreases, the shift speed quickens. The time constant limit value is the time constant at a maximum shift speed that can be realized by the differential thrust calculated in the step S4. The time constant limit value is set steadily smaller as the differential thrust increases and the shift speed rises.

In a step S6, a determination is made as to whether or not the time constant limit value is larger than a normal time constant. When the time constant limit value is larger than the normal time constant, the routine advances to a step S7, where the time constant limit value is set as the time constant. When the time constant limit value is equal to or smaller than the normal time constant, the routine advances to a step S8, where the normal time constant is set as the time constant.

In a step S9 (target speed ratio setting means), the target speed ratio is set on the basis of the time constant set in the step S7 or the step S8. Here, the target speed ratio is set at a maximum speed ratio that can be followed by the actual speed ratio when a speed change is performed at the time constant set in the step S7 or the step S8, or in other words the maximum currently realizable shift speed.

In a step S10, an instruction value of the step motor 40 is set on the basis of the target speed ratio.

Figure 4:
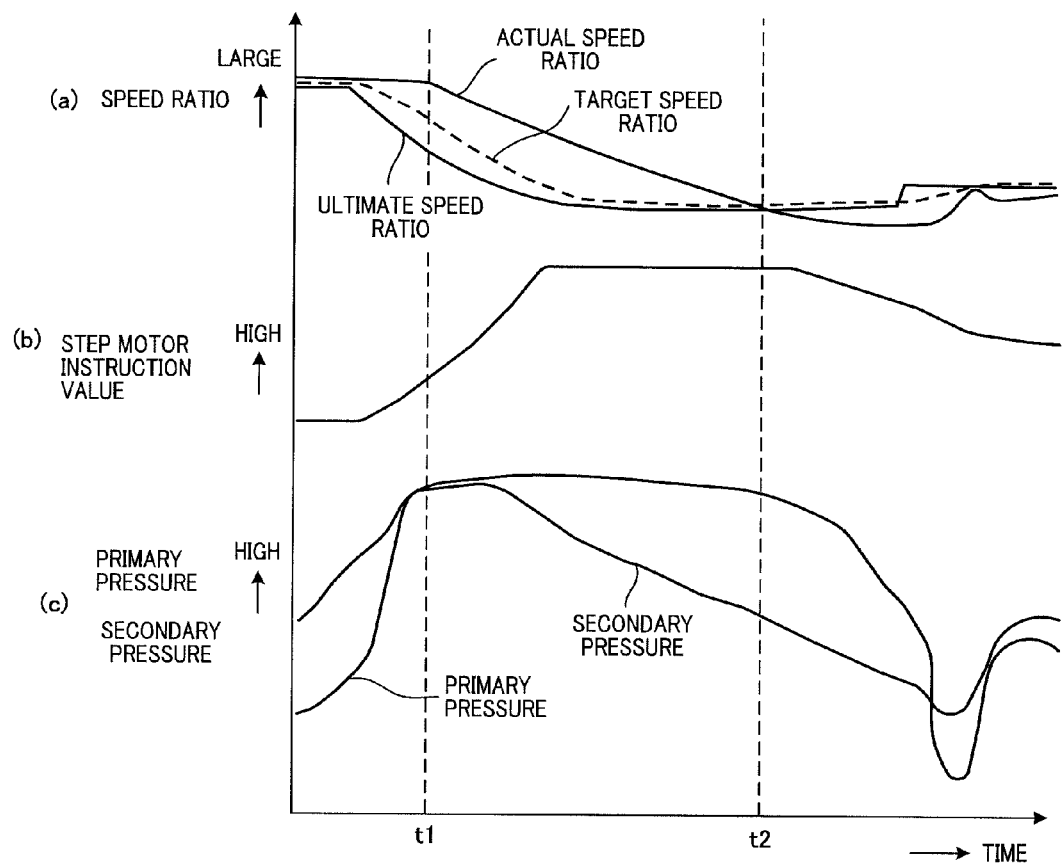
FIG. 4 is a time chart showing speed ratio change control according to a prior art example.
Figure 5:
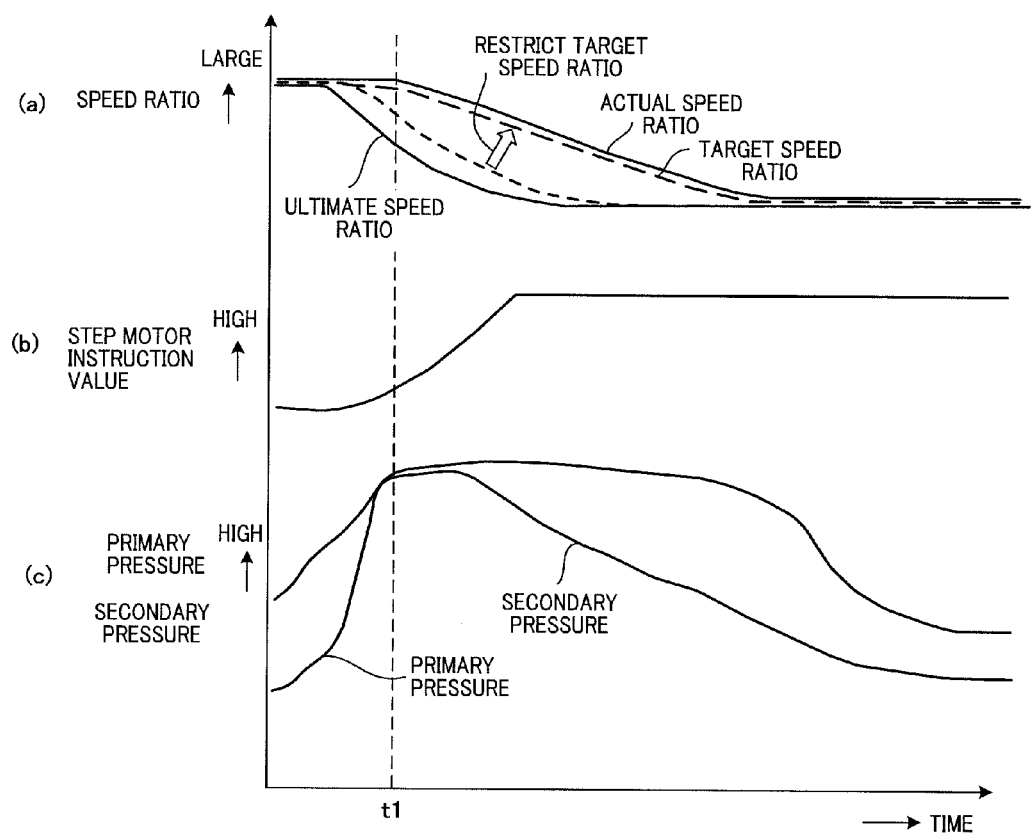
FIG. 5 is a time chart showing speed ratio change control according to this embodiment.

Next, the actions of this embodiment will be described using FIGS. 4 and 5. FIG. 4 is a time chart showing speed ratio change control according to a prior art example, in which (a), (b) and (c) indicate the speed ratio, the step motor instruction value, and the primary pressure and secondary pressure, respectively. FIG. 5 is a time chart showing the actions of the speed ratio change control device for a belt type continuously variable transmission according to this embodiment, in which (a), (b) and (c) indicate the speed ratio, the step motor instruction value, and the primary pressure and secondary pressure, respectively.

First, referring to FIG. 4, the prior art example will be described. When a rapid upshift is requested as the vehicle travels, the step motor 40 is fed to the High side, and at a time t1, the primary pressure rises to the maximum pressure that can be generated. However, since the secondary pressure is high and the primary pressure cannot be raised above the line pressure upper limit value, the differential thrust cannot be secured, and therefore the speed change is delayed, leading to an increase in the deviation between the actual speed ratio and the target speed ratio.

Thus, the feedback correction amount becomes excessive, and an excessive oil pressure is supplied to the primary pulley cylinder chamber 11c while the step motor 40 remains excessively on the High side. As a result, the actual speed ratio undershoots the target speed ratio at a time t2. To return the undershot actual speed ratio, the step motor 40 is fed to the Low side such that when the drain side passage of the speed ratio change control valve 32 is opened, too much oil pressure escapes, and as a result, the primary pressure decreases rapidly, leading to belt slippage.

Next, referring to FIG. 5, the actions of the speed ratio change control device for a belt type continuously variable transmission according to this embodiment will be described. When a rapid upshift is requested as the vehicle travels, the step motor 40 is fed to the High side, and at a time t1, the primary pressure rises to the maximum pressure that can be generated. At this time, the differential thrust that can actually be generated in the primary pressure is calculated on the basis of the line pressure upper limit value, and the realizable shift speed (time constant) is calculated from the differential thrust. Further, the target speed ratio is calculated on the basis of the shift speed (time constant), whereupon the step motor 40 is driven.

Thus, the actual speed ratio can be caused to follow the target speed ratio, and therefore the feedback correction amount does not become excessive. As a result, a situation in which the primary pressure decreases rapidly, causing belt slippage, can be prevented.

In the embodiment described above, the maximum thrust that can be generated by the primary pulley 11 is calculated on the basis of the line pressure upper limit value, and the target speed ratio is set on the basis of an upper limit value of the shift speed (a lower limit value of the time constant) calculated on the basis of the maximum thrust. Therefore, even when a rapid shift to the High side is performed from a state of high secondary pressure, a situation in which the actual speed ratio is shifted at a speed that exceeds the upper limit value of the shift speed so as to become unable to follow the target speed ratio can be prevented. Hence, the actual speed ratio can be prevented from undershooting the target speed ratio, and belt slippage caused when too much primary pressure escapes while returning the undershot actual speed ratio can also be prevented.

Further, the upper limit value of the shift speed is set higher (the time constant is set lower) as the difference between the balance thrust and the maximum thrust of the primary pulley 11 increases. Therefore, the realizable shift speed can be set appropriately on the basis of the differential thrust, and a situation in which the actual speed ratio cannot follow the target speed ratio can be prevented.

Moreover, the target speed ratio is set higher as the upper limit value of the shift speed increases, and therefore a situation in which the actual speed ratio cannot follow the target speed ratio can be prevented.

Furthermore, the upper limit value of the line pressure is calculated on the basis of the oil temperature and the rotation speed of the hydraulic pump 34, and therefore the calculation precision can be improved.

This application claims priority from Japanese Patent Application 2006-337966, filed Dec. 15, 2006, which is incorporated herein by reference in its entirety.

What is claimed is:

1. A speed ratio change control device for a continuously variable transmission comprising:
   a continuously variable speed ratio change mechanism in which a belt is wrapped around a primary pulley and a secondary pulley and a speed ratio is varied by controlling a pressure supplied to each pulley to displace a movable sheave of each pulley;
   a speed ratio change control valve which controls a primary pressure that serves as a pressure supplied to the primary pulley, using a line pressure supplied by a hydraulic pump as a source pressure; and
   a link mechanism which moves the speed ratio change control valve to a position in which the primary pressure varies when a speed ratio change actuator moves to a position corresponding to a target speed ratio of the continuously variable speed ratio change mechanism, and returns the speed ratio change control valve to a position in which the primary pressure is maintained by varying the primary pressure such that the movable sheave of the primary pulley displaces,
   the device comprising a controller which:
      calculates a maximum thrust that can be generated by the primary pulley on the basis of an upper limit value of the line pressure;
      calculates an upper limit value of a shift speed of the continuously variable speed ratio change mechanism on the basis of the maximum thrust that can be generated by the primary pulley; and
      sets the target speed ratio of the continuously variable speed ratio change mechanism on the basis of the upper limit value of the shift speed.

2. The speed ratio change control device as defined in claim 1, wherein the controller further sets the upper limit value of the shift speed of the continuously variable speed ratio change mechanism higher as a difference between a thrust of the primary pulley when the speed ratio of the continuously variable speed ratio change mechanism is in a state of equilibrium and the maximum thrust that can be generated by the primary pulley increases.

3. The speed ratio change control device as defined in claim 1, wherein the controller sets the target speed ratio of the continuously variable speed ratio change mechanism higher as the upper limit value of the shift speed increases.

4. The speed ratio change control device as defined in claim 1, wherein the upper limit value of the line pressure is calculated on the basis of an oil temperature and a rotation speed of the hydraulic pump.

5. A speed ratio change control method for a continuously variable transmission comprising:
   a continuously variable speed ratio change mechanism in which a belt is wrapped around a primary pulley and a secondary pulley and a speed ratio is varied by controlling a pressure supplied to each pulley to displace a movable sheave of each pulley;
   a speed ratio change control valve which controls a primary pressure that serves as a pressure supplied to the primary pulley, using a line pressure supplied by a hydraulic pump as a source pressure; and
   a link mechanism which moves the speed ratio change control valve to a position in which the primary pressure varies when a speed ratio change actuator moves to a position corresponding to a target speed ratio of the continuously variable speed ratio change mechanism, and returns the speed ratio change control valve to a position in which the primary pressure is maintained by varying the primary pressure such that the movable sheave of the primary pulley displaces,
   the method comprising:
      calculating a maximum thrust that can be generated by the primary pulley on the basis of an upper limit value of the line pressure;
      calculating an upper limit value of a shift speed of the continuously variable speed ratio change mechanism on the basis of the maximum thrust that can be generated by the primary pulley; and
      setting the target speed ratio of the continuously variable speed ratio change mechanism on the basis of the upper limit value of the shift speed.

6. The speed ratio change control method as defined in claim 5, wherein the calculating the upper limit value sets the upper limit value of the shift speed of the continuously variable speed ratio change mechanism higher as a difference between a thrust of the primary pulley when the speed ratio of the continuously variable speed ratio change mechanism is in a state of equilibrium and the maximum thrust that can be generated by the primary pulley increases.

7. The speed ratio change control method as defined in claim 5, wherein the setting sets the target speed ratio of the continuously variable speed ratio change mechanism higher as the upper limit value of the shift speed increases.

8. The speed ratio change control method as defined in claim 5, wherein the upper limit value of the line pressure is calculated on the basis of an oil temperature and a rotation speed of the hydraulic pump.

9. A speed ratio change control device for a continuously variable transmission comprising:
- a continuously variable speed ratio change mechanism in which a belt is wrapped around a primary pulley and a secondary pulley and a speed ratio is varied by controlling a pressure supplied to each pulley to displace a movable sheave of each pulley;
- a speed ratio change control valve which controls a primary pressure that serves as a pressure supplied to the primary pulley, using a line pressure supplied by a hydraulic pump as a source pressure; and
- a link mechanism which moves the speed ratio change control valve to a position in which the primary pressure varies when a speed ratio change actuator moves to a position corresponding to a target speed ratio of the continuously variable speed ratio change mechanism, and returns the speed ratio change control valve to a position in which the primary pressure is maintained by varying the primary pressure such that the movable sheave of the primary pulley displaces, the device comprising:
- primary maximum thrust calculating means for calculating a maximum thrust that can be generated by the primary pulley on the basis of an upper limit value of the line pressure;
- shift speed upper limit value calculating means for calculating an upper limit value of a shift speed of the continuously variable speed ratio change mechanism on the basis of the maximum thrust that can be generated by the primary pulley; and
- target speed ratio setting means for setting the target speed ratio of the continuously variable speed ratio change mechanism on the basis of the upper limit value of the shift speed.

10. The speed ratio change control device as defined in claim 9, wherein the shift speed upper limit value calculating means sets the upper limit value of the shift speed of the continuously variable speed ratio change mechanism higher as a difference between a thrust of the primary pulley when the speed ratio of the continuously variable speed ratio change mechanism is in a state of equilibrium and the maximum thrust that can be generated by the primary pulley increases.

11. The speed ratio change control device as defined in claim 9, wherein the target speed ratio setting means sets the target speed ratio of the continuously variable speed ratio change mechanism higher as the upper limit value of the shift speed increases.

12. The speed ratio change control device as defined in claim 9, wherein the upper limit value of the line pressure is calculated on the basis of an oil temperature and a rotation speed of the hydraulic pump.

* * * * *